No. 865,709. PATENTED SEPT. 10, 1907.
W. H. JOHNSON.
DEVICE FOR MEASURING HEIGHTS OF PERSONS.
APPLICATION FILED MAR. 27, 1906.
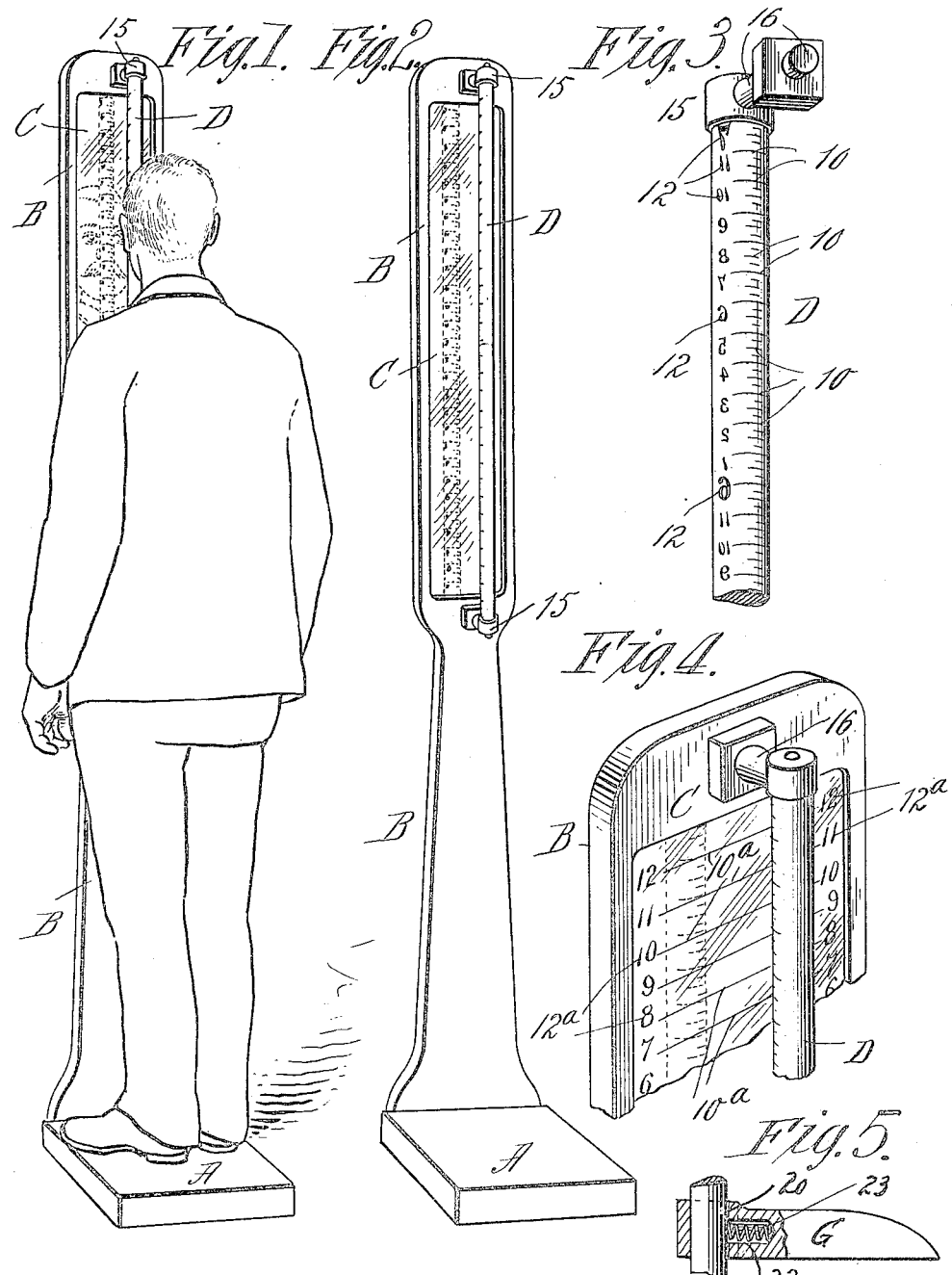

UNITED STATES PATENT OFFICE.

WILLIAM H. JOHNSON, OF BRANDON, VERMONT.

DEVICE FOR MEASURING HEIGHTS OF PERSONS.

No. 865,709.　　Specification of Letters Patent.　　Patented Sept. 10, 1907.

Application filed March 27, 1906　Serial No. 308,254.

*To all whom it may concern:*

Be it known that I, WILLIAM H. JOHNSON, a citizen of the United States of America, and a resident of Brandon, in the county of Rutland and State of Vermont, have invented certain new and useful Improvements in Devices for Measuring Heights of Persons, of which the following is a full, clear, and exact description.

This invention comprises a base, a vertical mirror having a fixed position suitably thereabove and a measuring scale vertically disposed in suitable relation to the mirror, whereby a person standing on the base may perceive, by his reflection on the mirror, with what registering mark of the scale the top of his head registers.

A device of the character substantially as above indicated constitutes an apparatus to be made use of in a profitable way at pleasure resorts, being available at such places and otherwise for amusement among parties, and for the ascertainment by individuals of physical facts of interest or importance to them.

The device in an approved form of its production is illustrated in the accompanying drawings, in which,—

Figure 1 is a perspective view showing the height measuring device and a person standing in relation thereto for the determination of his height by himself. Fig. 2 is a perspective view of the measuring device. Fig. 3 is a perspective view showing the rear side of an upper portion of the scale bar having reversed indicating characters thereon, and drawn on a larger scale.
Fig. 4 is a perspective view on a larger scale of a portion of the back or supporting uprights, the mirror and the scale bar. Fig. 5 is a vertical sectional view in detail of an appliance hereinafter referred to.

Similar characters of reference indicate corresponding parts in all of the views.

In the drawings,—A represents a base or platform rising above the rear end or side of which is a back or upright longer than the height of the tallest person, and affixed on the front of the upper portion of said upright is a mirror or reflecting plate C.

D represents a bar supported vertically at a short distance in front of the mirror having a scale thereon comprising graduation marks 10, and indicating characters 12, corresponding, for instance, to the foot and inch marks of the scale, and preferably reversed on the bar B so that the reflection thereof thrown back by the mirror will cause them to appear right side around, or "positive." The scale bar D is shown as held in top and foot sockets 15 therefor carried by studs 16, the shanks of which are connected with the uprights above and below the mirror, such studs standing forwardly from the upright for maintaining the scale bar properly at the slight distance in front of the mirror. A person standing erect on the base may perceive most readily by his reflection from the mirror with what scale mark and adjacent indicating number the top of his head registers.

In Fig. 4 the scale bar is shown with length graduation marks 10 and the mirror is shown with separated measurement lines horizontally thereon and with indicating numbers 12ª against such lines, this arrangement being possibly preferred in some cases as it enables the ascertainment, with less approximation, of a person's exact height. The scale bar may have a gage provided to slide vertically up and down thereon and comprising a portion extending straight and horizontally forwardly from the bar and at right angles to the length of the latter, such gage having, for instance, a frictional binding engagement with the bar and yet capable of being moved either up or down so that when a person assumes his position on the platfrom standing erect in front of the mirror the gage may be positioned so that its under edge is at the level of the top of the head and the point of registration of the gage on the scale bar may be perceived by the reflection from the mirror and the exact height of the person determined with no account to be taken for the distance between the eyes and the top of the head and the angle of the line of vision.

In Fig. 5 the gage is shown with an internal socket 22 opening to the aperture 20 therein by which is made slidable on the scale bar, a spiral spring 23 being held in compression in said socket and for frictioning the gage relatively to the bar.

I claim:—

A height measuring device comprising a base, an upright back, supported thereby and rising thereabove, having a mirror at a suitable height on the front side thereof, and said back having forwardly extended socket studs arranged in a vertical line at points above and below the mirror, and a bar, having its upper and lower ends engaged in the sockets of, and supported by, said studs, forwardly of and suitably distant from the face of the mirror, and said bar having a vertical measuring scale thereon.

Signed by me at Brandon Vt. in presence of two subscribing witnesses.

WILLIAM H. JOHNSON.

Witnesses:
F. P. COOKE,
F. H. JONES.